Figure 3:
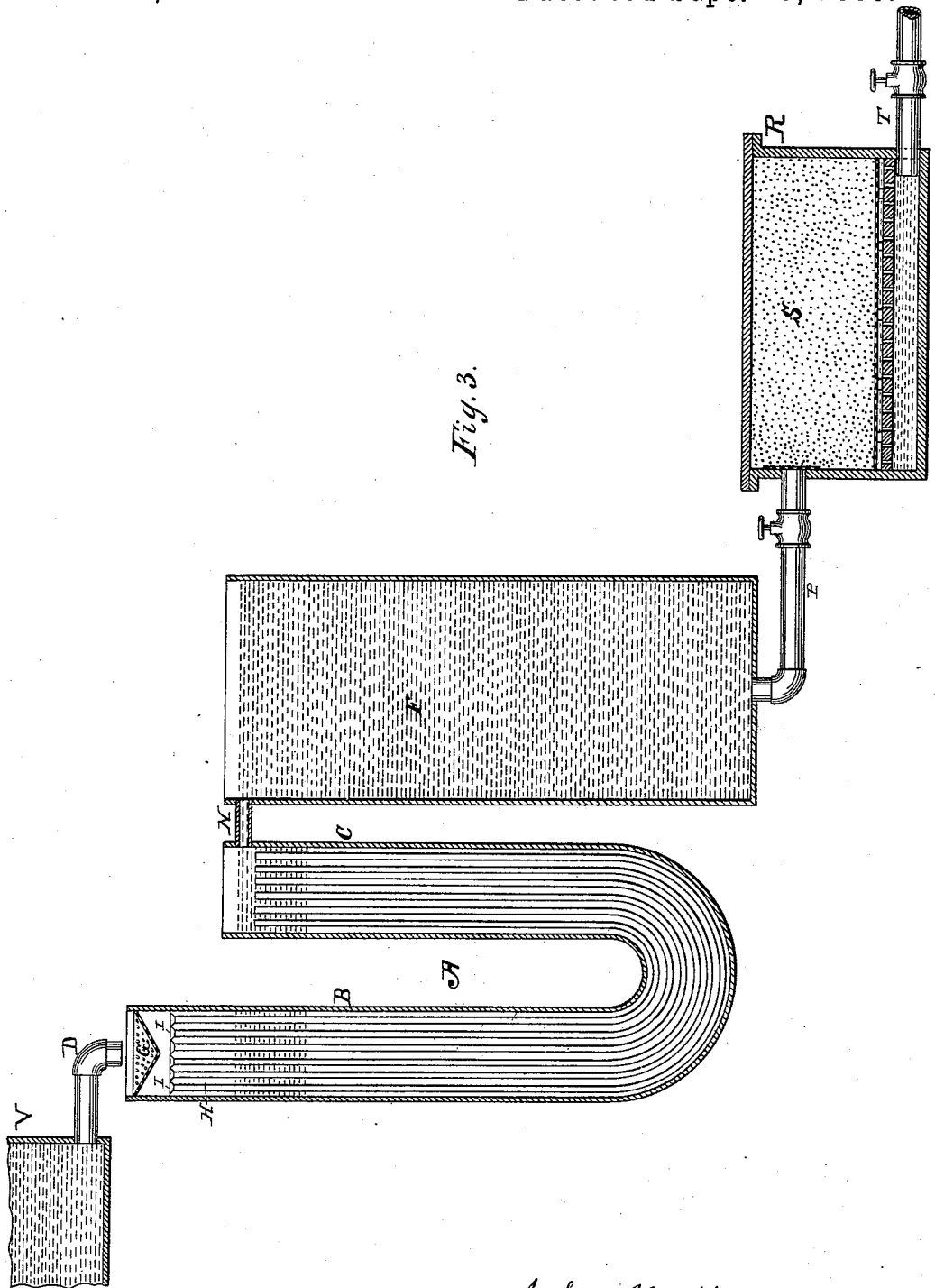

(No Model.) 3 Sheets—Sheet 1.
J. W. HYATT.
ART OF PURIFYING WATER.
No. 326,221. Patented Sept. 15, 1885.
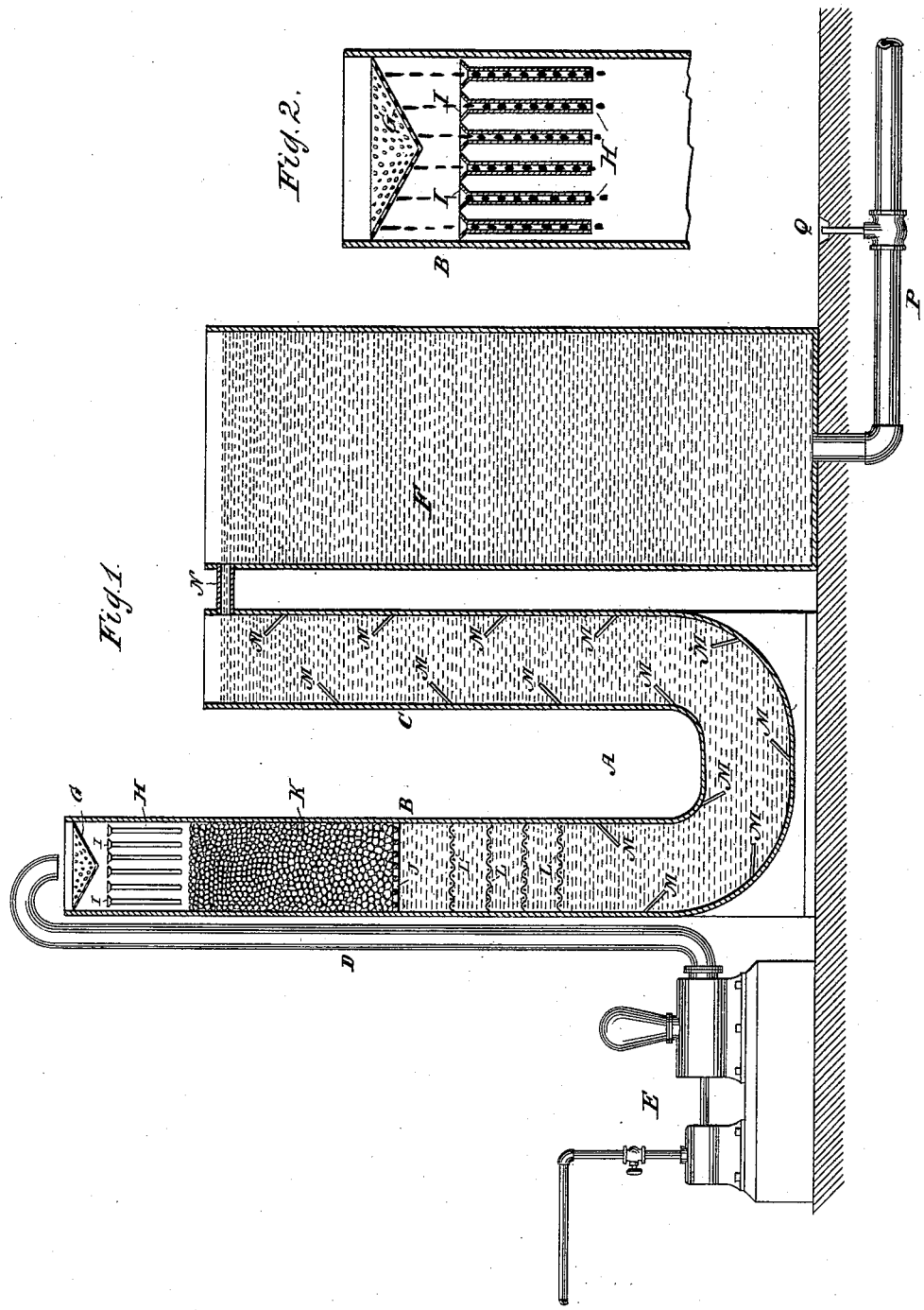
WITNESSES
Edward Wolff
George Cook
John W. Hyatt INVENTOR
By his Attorney
Rowland Cox (No Model.) 3 Sheets—Sheet 2.

J. W. HYATT.
ART OF PURIFYING WATER.

No. 326,221. Patented Sept. 15, 1885.

WITNESSES
Edward Wolff.
George Cook.

John W. Hyatt INVENTOR

By his Attorney
Rowland Cox (No Model.) 3 Sheets—Sheet 3.
J. W. HYATT.
ART OF PURIFYING WATER.
No. 326,221. Patented Sept. 15, 1885.
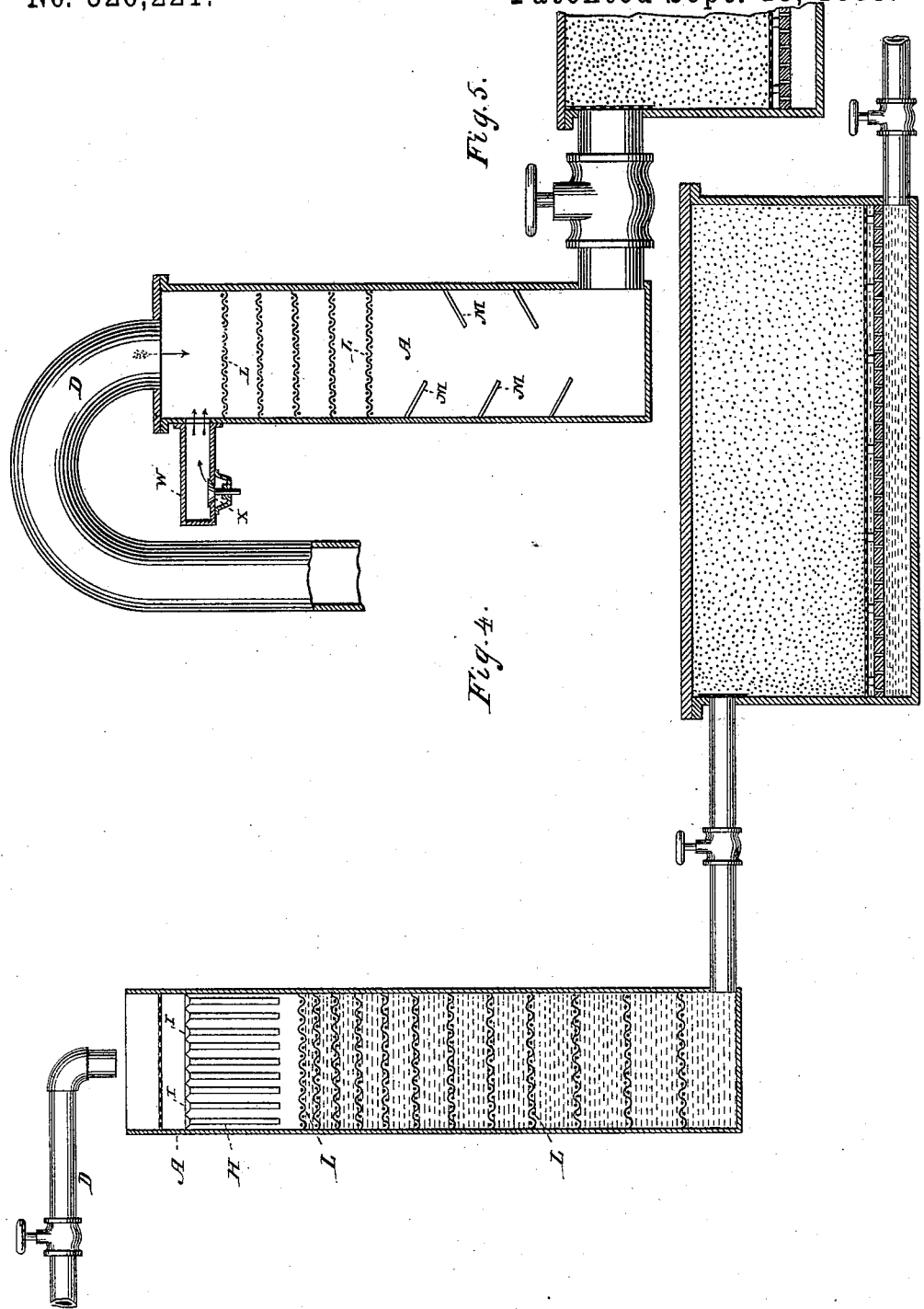
WITNESSES
Edward Wolff
George Cook
John W. Hyatt INVENTOR
By his Attorney
Rowland Cox

UNITED STATES PATENT OFFICE.

JOHN W. HYATT, OF NEWARK, NEW JERSEY.

ART OF PURIFYING WATER.

SPECIFICATION forming part of Letters Patent No. 326,221, dated September 15, 1885.

Application filed February 26, 1885. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Purifying Water, of which the following is a specification.

The invention relates to the art of purifying water; and it consists, essentially, in a novel apparatus whereby air may be intimately combined with the water for the purpose of oxidizing its impurities according to well-known principles, and the water then directly passed into the service-pipes of a city or house, or first into a filter, whereby all flocculent matter is arrested, and then into said service-pipes. The passage of the combined air and water through the bed of filtering material enhances the effect of the air upon the water, since the particles of the bed will finely subdivide the air and then combine and intermingle the subdivisions and again divide the air during its further passage through the filter. It is well understood that when air and water are intimately combined there will be a chemical action, the water absorbing the oxygen of the air and the impurities in the water being consumed or rendered inert. In this condition the materials remaining after the chemical action, while probably not injurious until further decomposition has taken place, are, to say the least, offensive to the eye. Whether or not the water and air will be brought into such intimate relation as to insure the chemical purification of the water thereby will depend upon the nature of the apparatus employed for effecting this purpose; and it is to be remarked that in the purification of water for large cities or for manufacturing districts it is essential that the apparatus be simple in construction and be capable of utilization without great expense as to the original construction as well as to its maintenance. The object of the present invention is, therefore, to produce an apparatus whereby, in a continuous process, water may be rendered chemically pure by its union with air and the inert material remaining in the water be removed, the apparatus being simple in construction and uniform and effective in its operation, and maintainable at a minimum expense.

The invention will be fully described in the detailed description hereinafter presented, reference being had to the accompanying drawings, in which—

Figure 1 is a central vertical longitudinal section of an apparatus embodying that part of my invention which relates to the union of the water and air. Fig. 2 is an enlarged vertical section of the upper end of the pipe A, illustrating the manner of subdividing the water and utilizing the subdivisions for conveying air into the tubes. Fig. 3 is a central vertical longitudinal section of the apparatus, illustrated as being in connection with an elevated reservoir and discharging into a filter, whereby the impurities in the water which have been rendered inert are arrested prior to the delivery of the water into the service-pipes of the city; and Figs. 4 and 5 are central vertical longitudinal sections of slightly-modified forms of the apparatus involving the invention sought to be protected hereby.

In the accompanying drawings, A designates the pipe or receptacle in which the water and air are combined. It consists of the branches lettered B and C, respectively, connected by a short bend, the upper end of both branches being open, and the mouth of the branch lettered B being elevated above the horizontal plane of the upper end of the branch lettered C. The pipe or receptacle A will contain suitable devices for thoroughly commingling the air and water, the pressure of the air being one atmosphere at the inlet and an increased number of atmospheres at the point of connection of the branches B C, at the upper end of the latter of which the unabsorbed air is discharged at a pressure of one atmosphere.

The devices arranged within the pipe or receptacle A for effecting the chemical union of the air and water may vary in their construction to a considerable extent, the main purpose being to keep the water in a constant state of agitation in connection with the air, and to prevent the escape of the latter until its desired union with the water has been effected. There are some features of special advantage in the construction I illustrate in the drawings for effecting the union of the air and water independent of the general novel features of the apparatus as a whole.

In the upper end of the branch B of the pipe or receptacle A, I illustrate an arrangement of devices in which I utilize in part the principle of the well-known Sprengel air-pump, and by means of which the stream of water supplied through the pipe D, leading from the pump E, is subdivided, and the subdivisions caused to pass through and draw air into tubes, in which there will be a partial union of the air and water prior to their discharge into the lower parts of the receptacle or pipe A, where there will be a further chemical union, owing to the constant agitation of the water and air during the passage of the former to the receiving tank or reservoir F. The water supplied by the pipe D is discharged upon the conical screen G, whereby it is subdivided or articulated, and passes into the series of tubes or Sprengel air-pumps H, arranged directly below the screen G, each of said tubes or pumps having a conically-shaped inlet, I, as illustrated more clearly in the enlarged sectional view denominated Fig. 2.

Below the tubes H (see Fig. 1) is arranged upon a grating, J, a bed of gravel, broken stone, or cobble-stones, K, and below this bed of stone is provided a series of screens, L, beyond which the sides of the pipe or receptacle A are furnished with a series of deflecting-plates, M.

While I have illustrated in the pipe A a bed of stone, K, screens L, and deflecting-plates M, it is not to be understood that all of these devices are to be used simultaneously, although they may be so employed, if desired.

I have the stone, screens, and blades M as illustrating the varied means which may be employed to keep the water in a constant state of agitation, so as to effectually accomplish the union of the air and water. It will be found entirely practicable to employ the bed of gravel or stone K, extending throughout the greater portion of the receptacle A or the screens L, the plates M being omitted. I have used the screens L (as well as the bed of stone) in this manner with entirely satisfactory results, and the apparatus thus constructed has the further advantages of being simple and inexpensive. The water passing into the tubes or pumps H will draw the air with it, as aforesaid, and the air and water passing through and around the stones K will be thoroughly intermingled and combined, and the pressure of the air will increase as the water descends to the lower level of the pipe or receptacle A, so that while the air enters the branch B at a pressure of one atmosphere it will increase as the water and air are forced along through the pipe toward the connection N, leading into the reservoir F, the air finally escaping at the upper end of the branch C at a pressure of one atmosphere.

The water may be led from the tank F for use by means of the delivery-pipe P, having a gate-valve, Q, or if it is desired to remove the flocculent inert substance also from the water the pipe P should lead to a filter, R, of any suitable construction, as shown in Fig. 3, in which S denotes a bed of granular filtering material and T a delivery-pipe. It is certainly desirable, and in many instances necessary, to remove the inert material, especially when the water is to be employed for manufacturing and domestic purposes. It is to be observed that the process is continuous from the pipe D to the delivery-pipe T, from which the water passes in a purified condition.

The pump E will not be necessary, of course, where the source of supply is from an elevated reservoir, either natural or artificial, as shown in Fig. 3, wherein V designates the supply for unfiltered and unaerated water. In Fig. 3 I have shown also the tube H as extending almost throughout the pipe or receptacle A, since this construction will serve to effectually combine the air with the subdivided streams of water, the air being drawn into the tubes H by and carried along with the water.

In the apparatus illustrated in Fig. 4 I utilize the screens L exclusively for subdividing and commingling the air and water, and omit one branch of the receptacle A. This form of apparatus may be connected directly with the filter, as illustrated in said Fig 4. It is not necessary in all cases to use a receptacle, A, consisting of two branches, since the only purpose of the receptacle is to receive the air and water, and to thoroughly combine and intermingle them so that the chemical action may be as complete as possible.

Fig. 5 shows another modification of my filter, the receptacle A having a closed top, and provided with the screens L and deflecting-plates M. In the top fits one end of the supply-pipe D, which is preferably about one-half of the diameter of the receptacle A. One side of this receptacle A is provided with a small pipe, W, the outer end thereof being closed, and provided on its under side with a valve, X, opening upwardly within the pipe. As the water flows down through the receptacle, taking the air with it, a partial vacuum is created in the pipe W, and the valve X formed therein allows the air to pass up through it to be commingled with the flowing water.

I am aware that in the art of filtration air has been combined with the water for the purpose of aerating it. An apparatus for accomplishing this result is illustrated in Letters Patent No. 229,774, granted to Daniel C. Otis on the 6th day of July, 1880, now owned by my assignee. Other patents on filtering apparatus have been issued in which means have been devised for aerating the liquid.

What I claim as my invention, and desire to secure by Letters Patent, is—

1. An apparatus for purifying water, consisting, essentially, of a receptacle constructed substantially as described, and a supply-pipe leading therein, a filter separated from but in communication with said receptacle, and adapted to receive the water after passing through the latter, and agitators located within the receptacle, for agitating and commingling the air and water before passing from the receptacle, and prior to its entrance into the filter, substantially as set forth.

2. In an apparatus for purifying water by aeration, a receptacle having at its open upper end a screen for articulating the stream of unpurified water, and a series of Sprengel air-pumps below said screen to receive the articulated divisions of the stream, in combination with a water-supply, substantially as set forth.

3. In an apparatus for purifying water by aeration, the combination, with a water-supply, of a receptacle open at its upper end to admit air, a series of Sprengel air-pumps located within the receptacle below the inlet for air and water, agitators below said pumps for keeping in agitation, and thus facilitating the union of the air and water, and an outlet from the receptacle, substantially as set forth.

4. In an apparatus for purifying water by aeration, the combination, with a receptacle open at its upper end to admit air, of a supply-pipe leading therein, a series of Sprengel air-pumps located within the receptacle and below the air and water supply, and a screen or its equivalent below the pumps, substantially as and for the purposes set forth.

5. In an apparatus for purifying water, the combination, with a receptacle, an air-supply and a supply-pipe for water at its upper end, of a series of Sprengel air-pumps located within the receptacle below the air and water supply, agitators for disturbing the flow of the water and air below said pumps, and a filter in communication with said receptacle, substantially as set forth.

6. In an apparatus for purifying water by aeration, the combination, with the receptacle A, open to admit air, of a series of Sprengel air-pumps, H, located therein, and having inverted-cone-shaped mouths I, and a water-supply above said pumps, substantially as set forth.

7. In an apparatus for purifying water by aeration, the combination of a water-supply with a receptacle, A, open at its receiving end to admit air, and composed of branches B C, a screen, G, for articulating the inflowing current of water, a series of Sprengel air-pumps, H, below said screen, a bed of broken stone or gravel below said pumps, and a delivery, substantially as set forth.

8. An apparatus for purifying water, consisting of the receptacle A, composed of branches B C, the former being taller than the latter, and both having their upper ends open, a water-supply leading to the receptacle, and screens within the receptacle for subdividing the water and air, thus facilitating their union, and a filter removed from but in communication with said receptacle, substantially as set forth.

9. In an apparatus for purifying water, the receptacle A, composed of the branches B C, the former, being open to admit air, taller than the latter and containing the articulating screen G, and Sprengel air-pumps H, in combination with the supply-pipe D, a filter containing a bed of filtering material, and a connection between the filter and branch C, substantially as set forth.

Signed at New York, in the county of New York and State of New York, this 29th day of January, A. D. 1885.

JOHN W. HYATT.

Witnesses:
GEORGE COOK,
HERMAN GUSTOW.